United States Patent [19]

Marey

[11] 4,300,166
[45] Nov. 10, 1981

[54] SYSTEM FOR TRANSMITTING SIGNALS BETWEEN A TELEVISION CAMERA AND THE ASSOCIATED CONTROL UNIT

[75] Inventor: Mohamed Marey, Gross-Gerau, Fed. Rep. of Germany

[73] Assignee: Robert Bosch GmbH, Stuttgart, Fed. Rep. of Germany

[21] Appl. No.: 102,781

[22] Filed: Dec. 12, 1979

[30] Foreign Application Priority Data

Dec. 18, 1978 [DE] Fed. Rep. of Germany ....... 2854610

[51] Int. Cl.³ .......................................... H04N 5/24
[52] U.S. Cl. ..................................... 358/210; 455/603
[58] Field of Search ......................... 358/210; 455/603

[56] References Cited

U.S. PATENT DOCUMENTS 3,534,160 10/1970 Lowenstein ................... 358/210 X
3,827,074 7/1974 De Thieullay ................. 358/310 X
4,054,794 10/1977 Laughlin ............................ 250/199

Primary Examiner—Robert L. Richardson
Attorney, Agent, or Firm—Frishauf, Holtz, Goodman & Woodward

[57] ABSTRACT

Signals to be transmitted through optical fibers either from a television camera to its control unit or vice versa are processed as follows. At first audio signal to be transmitted is amplitude modulated on a carrier. A second audio signal, which has a frequency range which does not include the frequency of the above-mentioned carried, and the amplitude modulated signal are frequency modulated onto a second carrier. The locally generated video signal, after passing through a digital data transmitter, as well as the frequency modulated signal are pulse modulated and the pulse modulated signal is used to modulate the light of a laser, the light in turn being transmitted by the optical fibers. At the receiving end a photo diode is provided to transduce the signal back into electrical signals and, after the demodulation in reverse order as the modulation, the desired signals are available at the receiving location.

5 Claims, 2 Drawing Figures

SYSTEM FOR TRANSMITTING SIGNALS BETWEEN A TELEVISION CAMERA AND THE ASSOCIATED CONTROL UNIT

The present invention relates to systems for transmitting signals from a television camera to a control unit, and from the control unit to the television camera, the two being connected by an optical wave guide.

BACKGROUND AND PRIOR ART

A system for transmitting signals through optical fibers between a television camera and its associated control and display unit is disclosed in DE-AS No. 20 12 293. In this apparatus, however, only a video signal is transmitted from the camera to the display unit and a control signal is transmitted in the opposite direction.

THE INVENTION

It is an object of the present invention to furnish a system of the above-described type in which all signals necessary for the operation of a television camera and, in particular, a color television camera, can be transmitted with a good signal-to-noise ratio and without non-linearities. It is a further object of the present invention that such a system should not require much additional equipment.

In accordance with the present invention, means are provided for generating a first and second carrier signal, both on the control unit end and the camera end. The second carrier signal is modulated with a first audio signal to be transmitted and the amplitude modulated signal, together with a second audio signal to be transmitted and frequency modulated onto the first carrier. The video signal, after passing through a digital data transmitter, and the frequency modulated signal are pulse modulated. The resulting pulse modulated signal modulates the light of a laser beam which is applied to the optical fibers. On both the camera side and the control unit side, receiver and demodulator means are provided which receive and demodulate the respective signals.

DRAWINGS ILLUSTRATING A PREFERRED EMBODIMENT

Figure 1:
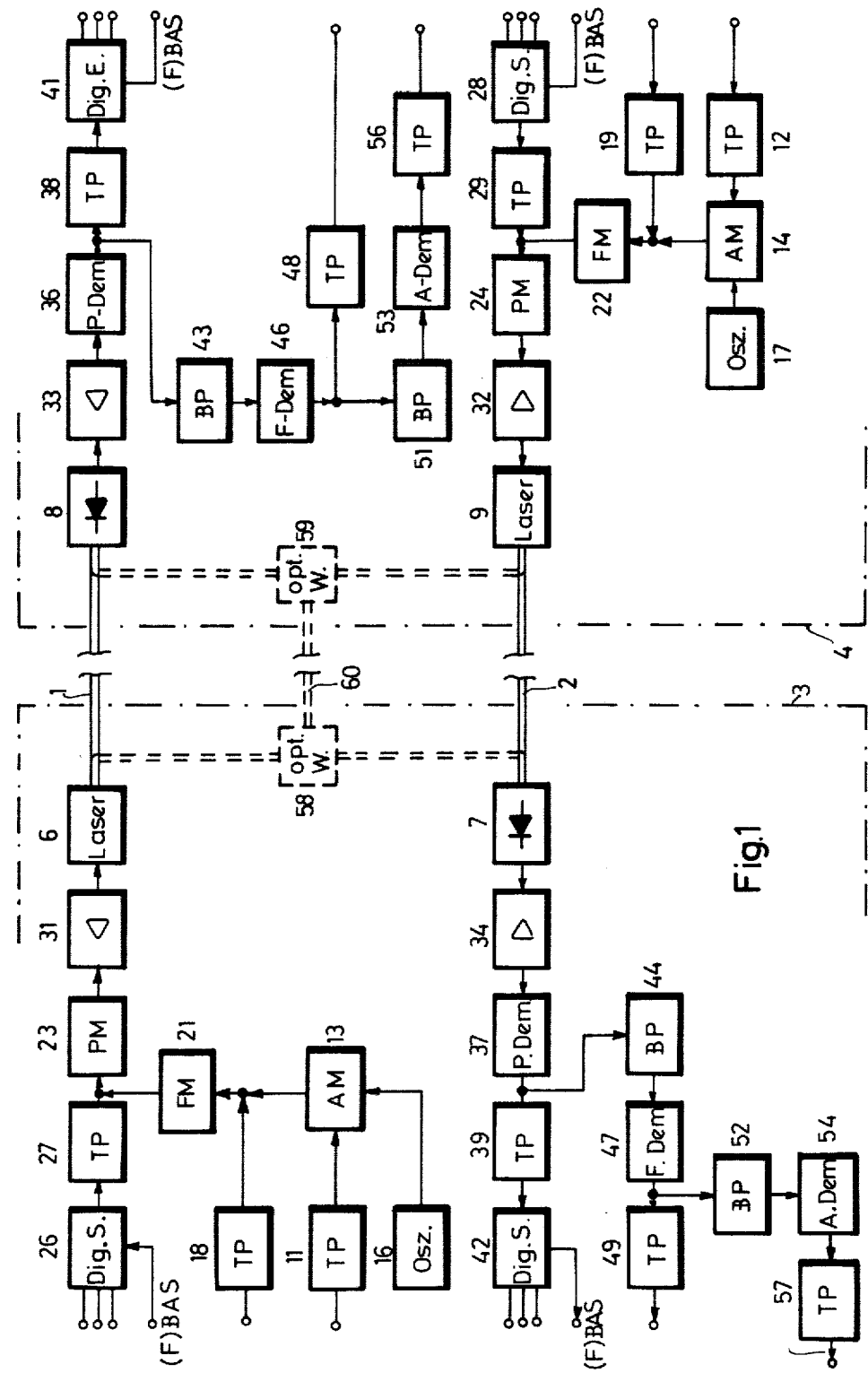
FIG. 1 is a block diagram showing the system of the present invention.

The equipment necessary for generating the signals for transmission through the optical wave guides 1 and 2 from the television camera 3 to the associated control unit 4 and vice versa are shown on FIG. 1. In the camera, a laser 6 furnishes the light to the ends of optical fibers 1, while in the control unit a laser 9 is provided. The lasers may be semiconductor injection lasers. On the camera side, signals from the control and display unit are received and applied to a photo diode 7, for example an avalanche diode, while in the control unit a photo diode 8 of the same type is provided.

Lasers 6 and 9 emit light modulated in accordance with the electrical signals to be transmitted and this light is applied to optical fibers 1 and 2. On the respective receiving ends, photo diodes 8 and 7 change the light back into corresponding electrical signals.

Figure 2:
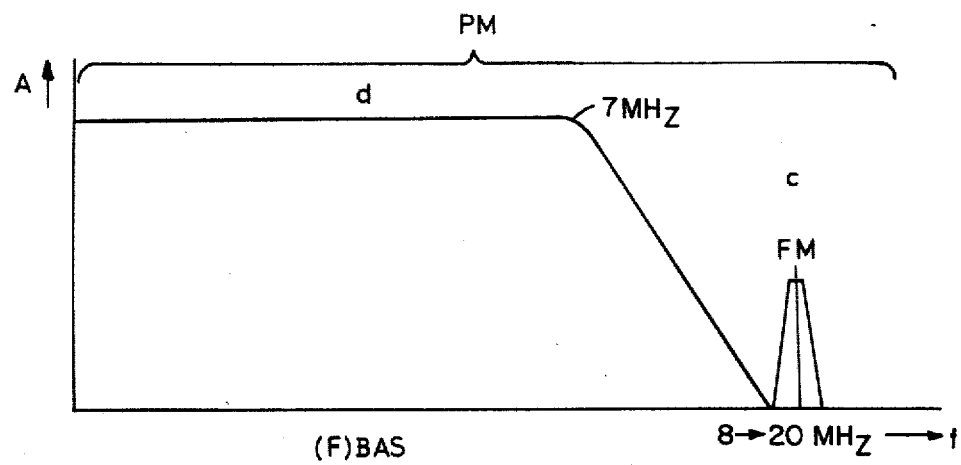
FIG. 2 shows the frequency variation of the signals to be transmitted in the system of FIG. 1.
Figure 2:
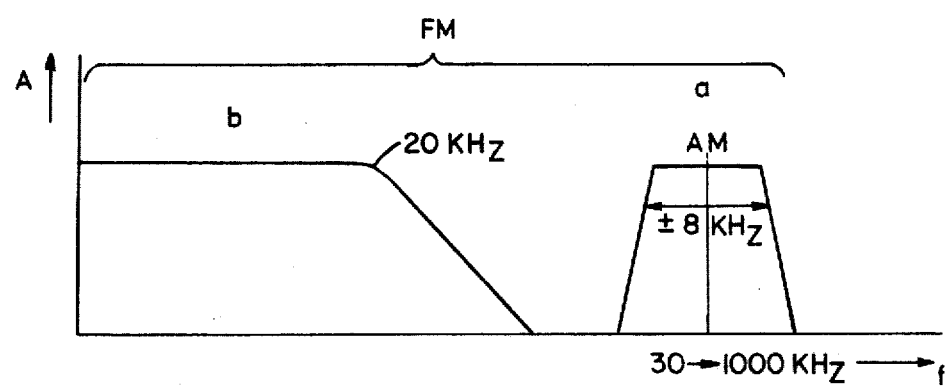

The signals to be transmitted through the optical fibers are processed as follows: on the camera side, audio first signals such as communication signals are applied to a low pass filter 11, while similar signals on the control unit side are applied to a low pass filter 12. The signals at the outputs of low pass filters 11 and 12 are, respectively, applied to amplitude modulators 13 and 14, where they are amplitude modulated onto a carrier signal which will be termed a second carrier signal of, for example, 50 Khz generated in oscillators 16 and 17, respectively. The frequency range of signals at the outputs of modulators 13 and 14 are shown as curve a in FIG. 2. If additional audio signals are to be transmitted, these could be modulated onto further carriers. The result is an amplitude modulated signal.

Another, termed a second audio signal, for example an audio program signal on the camera side or of program control tone on the control unit side, is applied to low pass filters 18 and 19, respectively. The outputs of low pass filters 18 and 19 are shown as curve b in FIG. 2. The amplitude modulated signals and the unmodulated second audio signals are applied to a frequency modulator 21, 22, respectively which provide a first carrier signal of, for example, carrier frequency of approximately 12 MHz. The result is a frequency modulated signal, the output of the frequency modulator being illustrated in curve c of FIG. 2. These signals, together with a (color) video signal are applied to the inputs of pulse modulators 23, 24, respectively. Preferably, the pulse modulators are pulse frequency modulators. The result is a pulse modulated signal.

In camera 3, the (color) video signal is generated in a conventional pickup tube and processed conventionally. This video signal is applied to a digital data transmitter 26 which also receives control or acknowledgement signals at further inputs. These control or acknowledgement signals are digitalized and inserted into the horizontal or vertical retrace intervals of the video signal. The (color) video signal at the output of the digital data transmitter 26, with the digital control signals in the retrace intervals, is applied to a low pass filter 27 whose output is illustrated by the frequency distribution shown as curve d in FIG. 2.

In the control unit 4 the (color-) video signal, such as a signal, is similarly applied to a digital data transmitter 28. Digital data transmitter 28 also has further inputs. The latter receive control signals for controlling individual camera functions as, for example, raster registration, adjustment of the objective lens, filter adjustment, etc. These signals are also digitalized and inserted into the horizontal and vertical retrace intervals of the video signal. The video signal at the output of digital data transmitter 28 is applied through a low pass filter 29 to the input of a pulse modulator 24. Pulse modulator 24 also receives the frequency modulated signal.

The output signal of pulse modulators 23 and 24 is applied through an amplifier 31, 32, respectively, to the respective lasers 6 and 9. The laser beam is thus modulated with signals of frequency bands d and c shown in FIG. 2.

At the receiving ends of optical fibers 1 and 2, respectively, the received light signals are transduced into optical signals by photo diodes 8 and 7, respectively. These are then amplified in amplifiers 33 and 34, respectively. These signals are then demodulated in the opposite sequence and corresponding to the type of modulation discussed above.

First the received signal is separated by demodulation and pulse demodulators 36 and 37, respectively into the (color-) video signal (d) and a frequency modulated signal (c). The video signal is applied to a digital receiver 41, 42, respectively through low pass filters 38 and 39, respectively. Here the control signals are also separated from the video signal, so that both the video signal and the control signals can be derived from the outputs of digital receivers 41 and 42.

The frequency modulated signal (c) is applied through a band pass amplifier 43, 44 to a frequency demodulator 46, 47, respectively. At the outputs of frequency demodulators 46 and 47, signals of frequency distribution a and b are therefore generated. The program audio or program control signal (b) is further applied to a low pass filter 48, 49, respectively. The communications signals (a) are applied through band pass amplifiers 51 and 52, respectively to amplitude demodulators 53 and 54, respectively. Following demodulation, these signals are also applied to a band pass filter, namely band pass filters 56 and 57, respectively. The signals available at the output terminals of control unit 4 are those of camera 3, and are almost indistinguishable from the originally transmitted signal, when this type of transmission is used.

Instead of having individual optical fibers 1 and 2 for transmitting from the camera to the control unit and from the control unit to the camera, respectively, it is possible to use only a single optical fiber for signal transmission between the two units. This can be accomplished if, as shown in broken lines in the drawing, optical switches 58 and 59 are supplied at the respective ends of the optical fiber 60.

Various changes and modifications may be made within the scope of the inventive concepts.

I claim:

1. In a system having a television camera generating a camera video signal and at least a first and second camera audio signal, a control unit including means for generating a control video signal and at least a first and second control audio signal, optical wave guide means for transmitting signals between said control unit and said camera, and wherein said first audio signal has a predetermined frequency range;

apparatus for generating signals suitable for transmission through said optical wave guide means, comprising means for generating a first and second carrier signal, said second carrier signal having a frequency outside of said predetermined frequency range;

means (13) for amplitude modulating said second carrier signal with said first audio signal, thereby creating an amplitude modulated signal;

means for frequency modulating said second audio signal and said amplitude modulated signal onto said first carrier signal, thereby creating a frequency modulated signal;

means (23) for pulse modulating said frequency modulated signal and said video signal, thereby creating a pulse modulated signal;

means (6) for furnishing a laser beam and applying said laser beam to said optical wave guide means; and means for modulating said laser beam with said pulse modulated signal, thereby creating said signal for transmission through said optical wave guide means.

2. A system as set forth in claim 1, further comprising receiving and demodulating means in said camera and said control unit for receiving and demodulating the so-transmitted signal.

3. A system as set forth in claim 1, wherein said optical wave guide means comprise a first optical wave guide for transmitting said signals from said camera to said control unit and a second optical guide for transmitting signals from said control unit to said camera.

4. A system as set forth in claim 1, wherein said optical wave guide means comprises a single optical wave guide, and first and second optical switching means at said camera and said control unit, respectively.

5. A system as set forth in claim 1, wherein said control unit includes means for generating control signals for said camera, and said camera comprises means for generating acknowledgment signals;

wherein said video signal has horizontal and vertical retrace intervals; and further comprising means for inserting said control and acknowledgment signals into said horizontal and vertical retrace intervals.

* * * * *